Aug. 29, 1944.    G. W. HUTCHINSON    2,356,852
METHOD AND APPARATUS FOR MAKING CONCRETE PIPE
Filed Jan. 28, 1942    6 Sheets-Sheet 1

Inventor:
George W. Hutchinson,
Attorneys.

Aug. 29, 1944.  G. W. HUTCHINSON  2,356,852
METHOD AND APPARATUS FOR MAKING CONCRETE PIPE
Filed Jan. 28, 1942  6 Sheets-Sheet 2
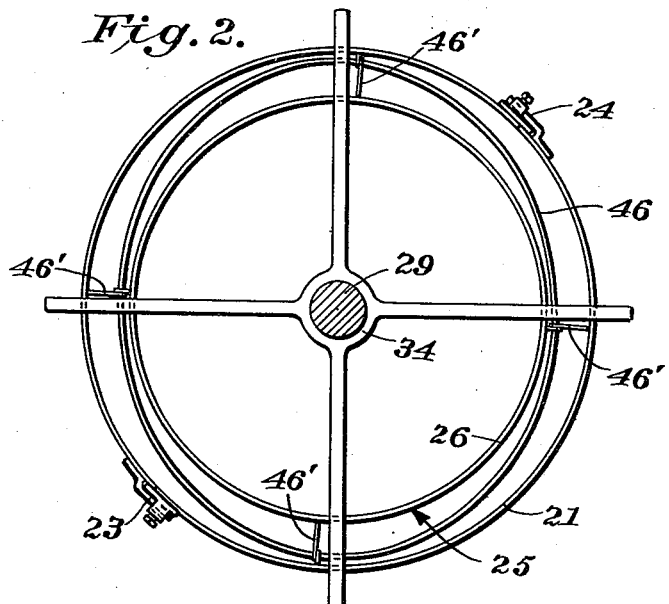
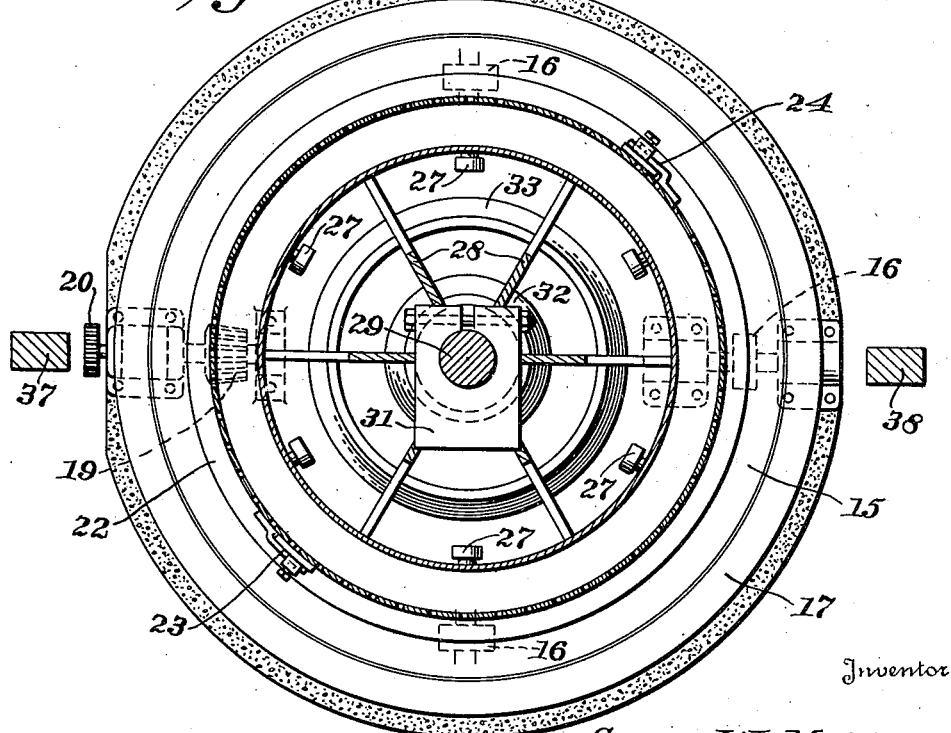

Aug. 29, 1944.  G. W. HUTCHINSON  2,356,852
METHOD AND APPARATUS FOR MAKING CONCRETE PIPE
Filed Jan. 28, 1942   6 Sheets-Sheet 3
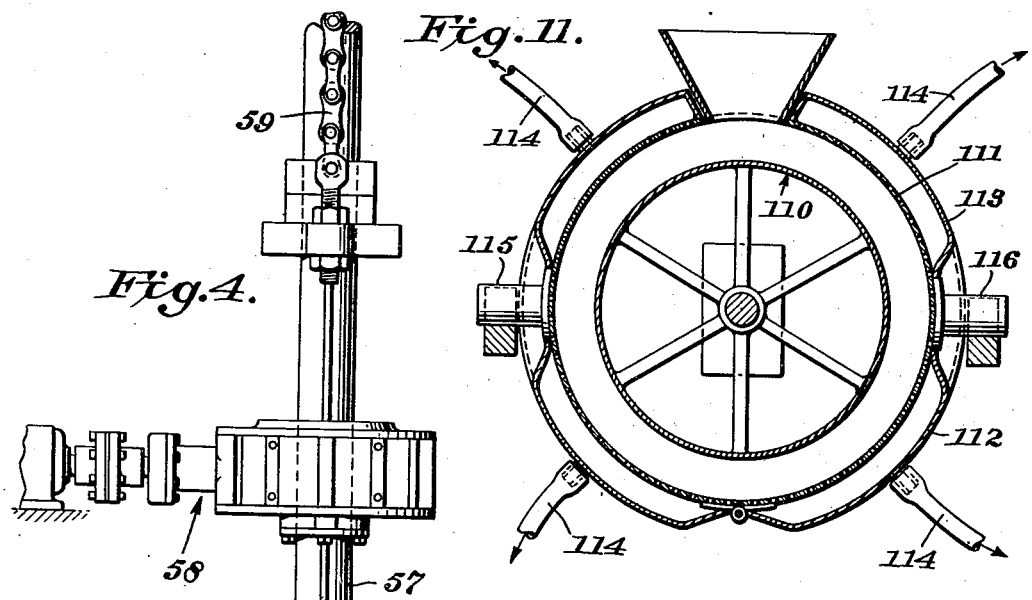
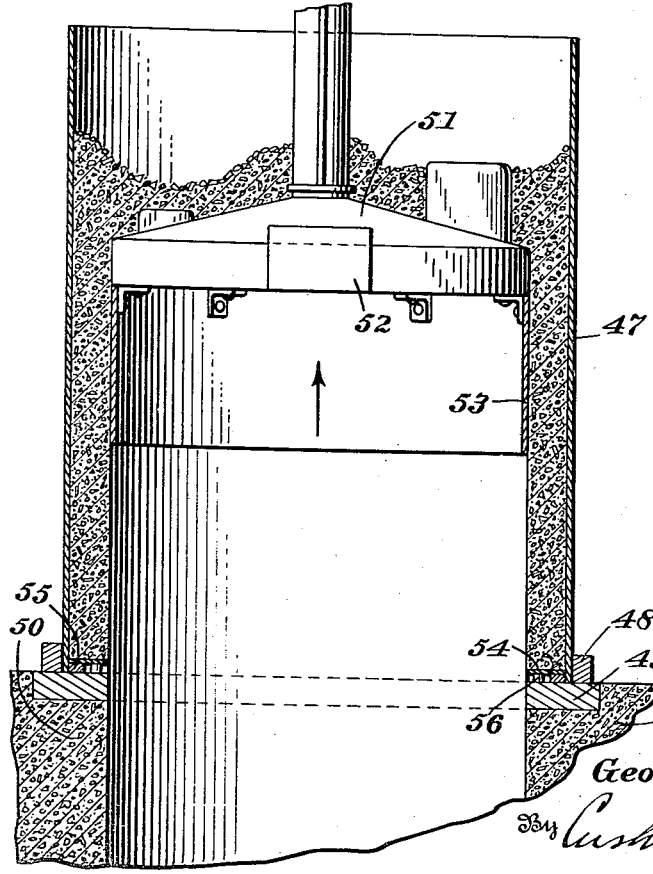
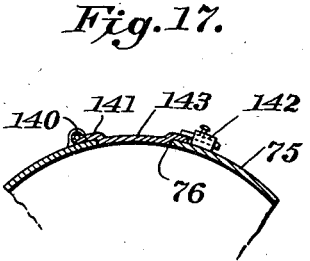
Inventor:
George W. Hutchinson,
By Cushman Darby & Cushman
Attorneys.

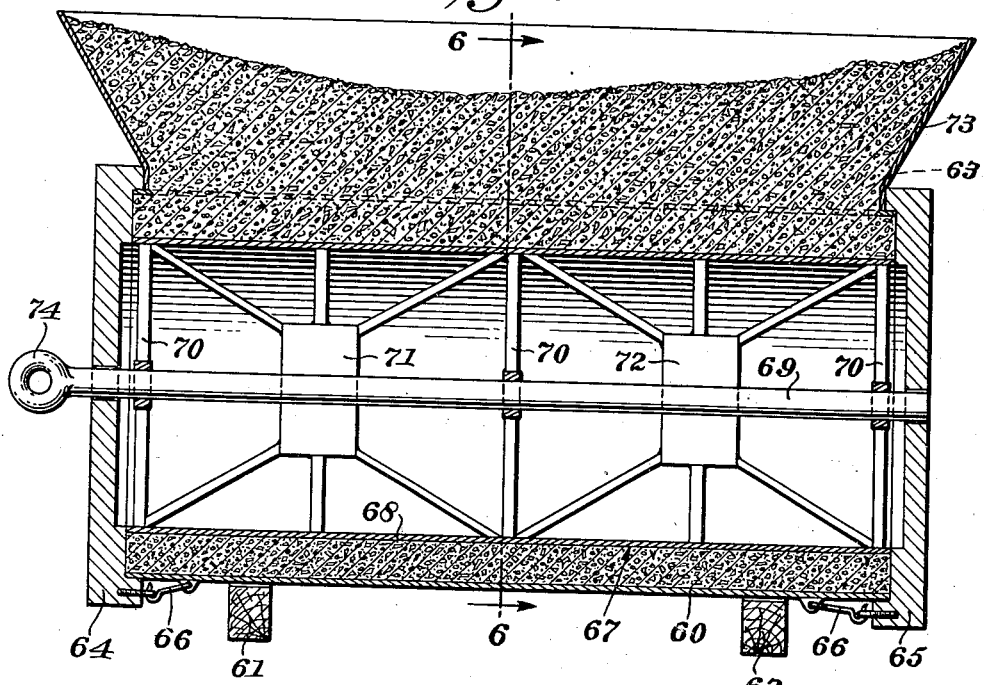
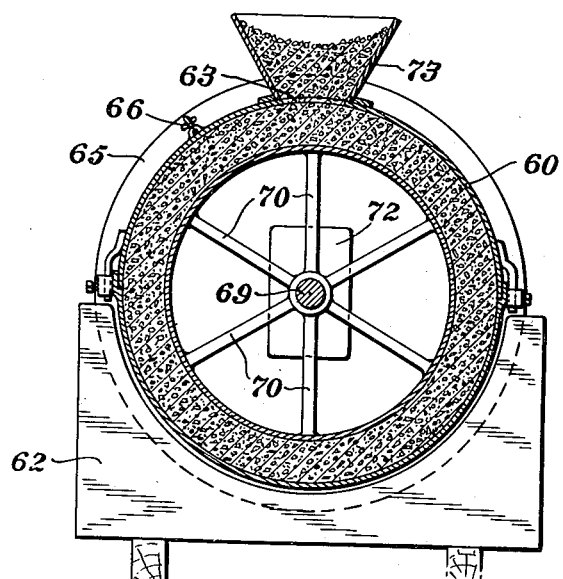

Aug. 29, 1944.  G. W. HUTCHINSON  2,356,852
METHOD AND APPARATUS FOR MAKING CONCRETE PIPE
Filed Jan. 28, 1942  6 Sheets-Sheet 5
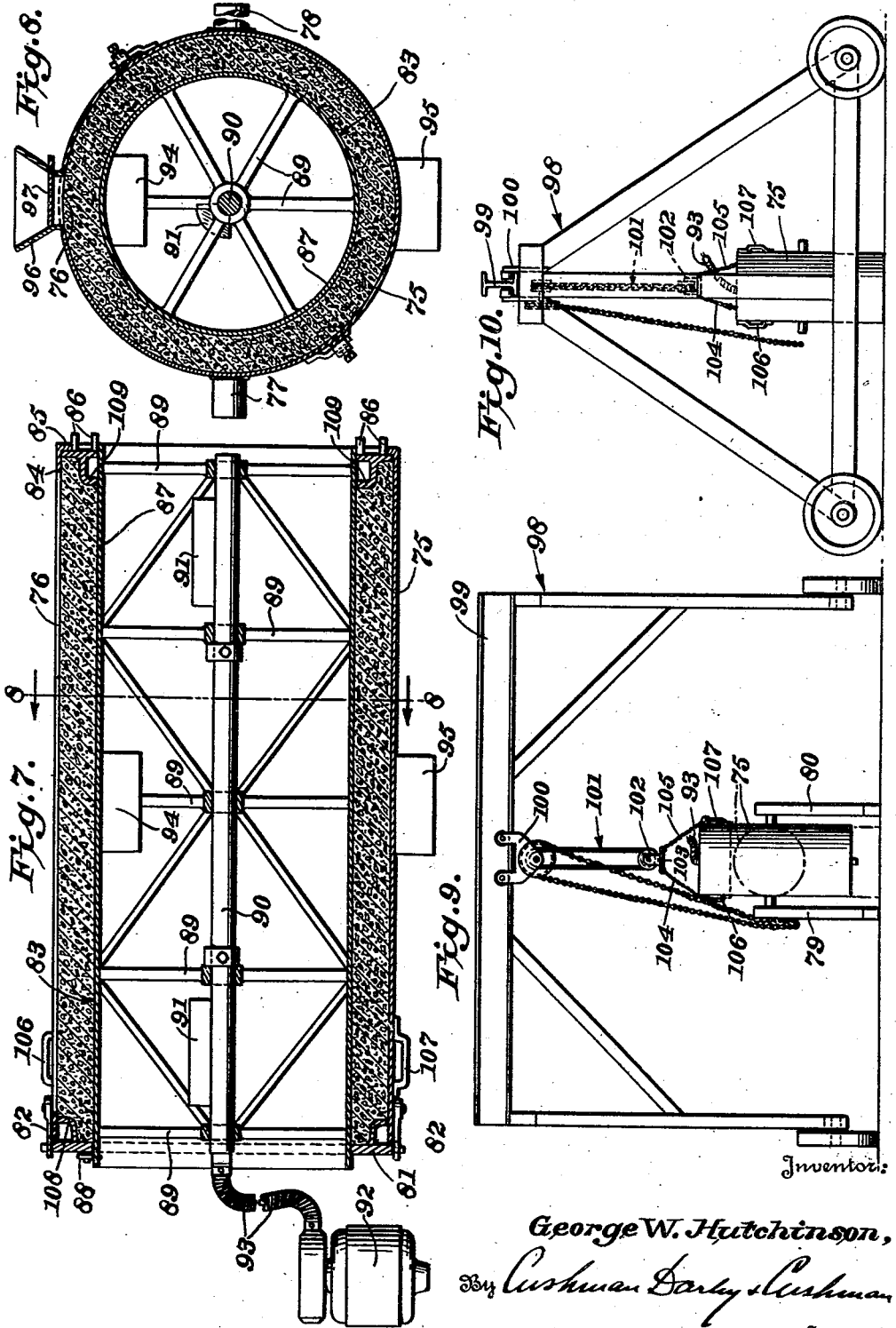
Inventor:
George W. Hutchinson,
By Cushman Darby & Cushman
Attorneys.

Aug. 29, 1944.  G. W. HUTCHINSON  2,356,852
METHOD AND APPARATUS FOR MAKING CONCRETE PIPE
Filed Jan. 28, 1942  6 Sheets-Sheet 6
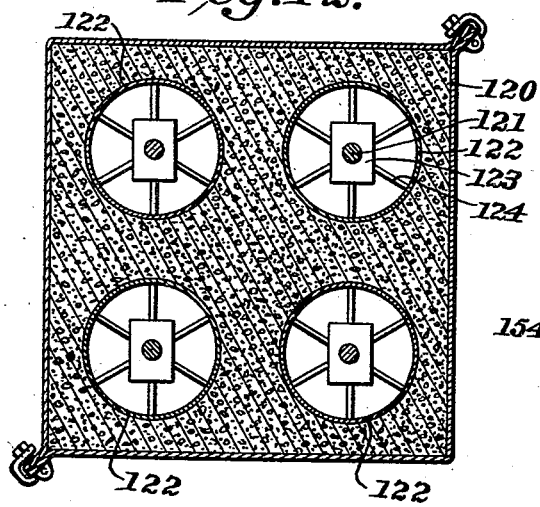
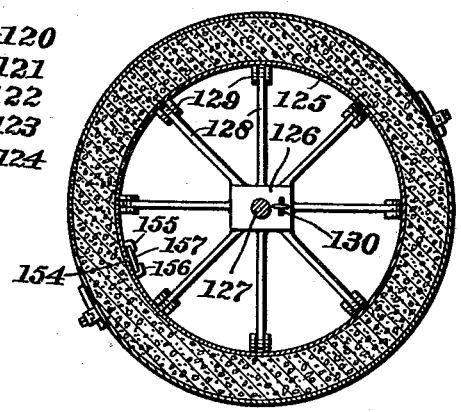
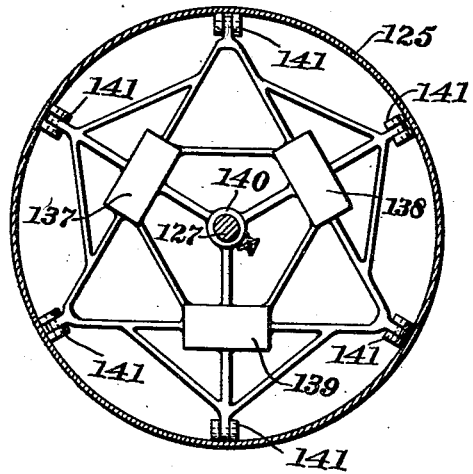
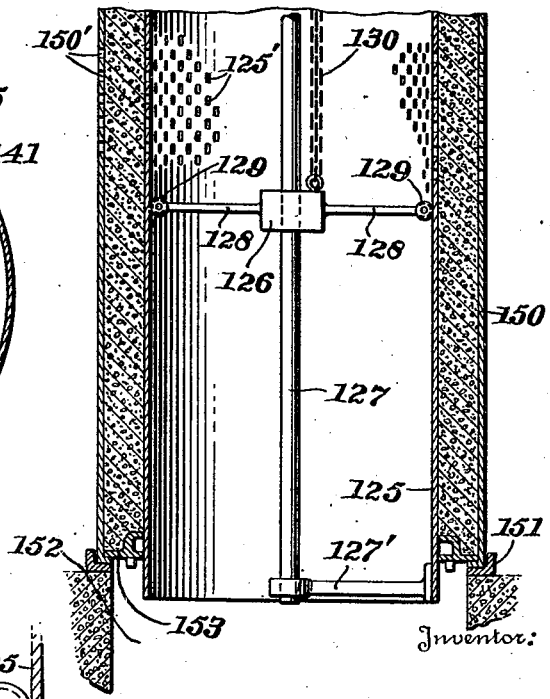
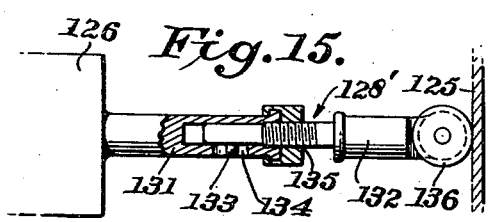

Patented Aug. 29, 1944

2,356,852

UNITED STATES PATENT OFFICE 2,356,852

METHOD AND APPARATUS FOR MAKING CONCRETE PIPE

George W. Hutchinson, Raleigh, N. C.

Application January 28, 1942, Serial No. 428,616

8 Claims. (Cl. 25—36)

This invention relates to method and apparatus for making concrete pipe. A main object of the invention is to enable pipe of this type to be made of superior character, quickly, and with a minimum amount of equipment. To these ends, a principal feature of the invention is the employment of special means for the quick and thorough compacting of the mix. Illustrative apparatus for carrying out the purposes of the invention is shown in the accompanying drawings with reference to which the description will proceed.

In the drawings:

Figure 2 is a section substantially on line 2—2 of Figure 1 and shows additionally a manner in which a single line of reinforcing coil may be disposed between the forms;

Figure 3 is a section substantially on line 3—3 of Figure 1;

Figure 4 is a vertical section of apparatus in accordance with the invention utilizing a packer head to form the inside surface of the pipe;

Figure 5 is a vertical section of a modified form of apparatus in accordance with the invention showing inner and outer forms in a horizontal charging position;

Figure 6 is a section substantially on line 6—6 of Figure 5;

Figure 7 is a vertical section of a still different embodiment of the invention with inner and outer forms, as in Figures 5 and 6, in horizontal charging position;

Figure 8 is a section substantially on line 8—8 of Figure 7;

Figure 9 is a front elevation of apparatus including the forms of Figures 7 and 8 together with handling means therefor;

Figure 10 is a side elevation of the apparatus of Figure 9 with the parts in different relation;

Figure 11 is a transverse section similar in general to that of Figure 6, but showing additionally the application of suction jacketing to the outer form;

Figure 12 is a horizontal section of multiple conduit equipment according to the invention;

Figure 13 is a transverse section of equipment utilizing vibrating means traversable axially of the core;

Figure 14 is a fragmentary axial section of the apparatus of Figure 13;

Figure 15 is an elevation of a detail, partly in section;

Figure 16 is a transverse section showing core vibrating means utilizing multiple vibrating units, and Figure 17 is a partial sectional view showing a mold detail.

Figure 1:
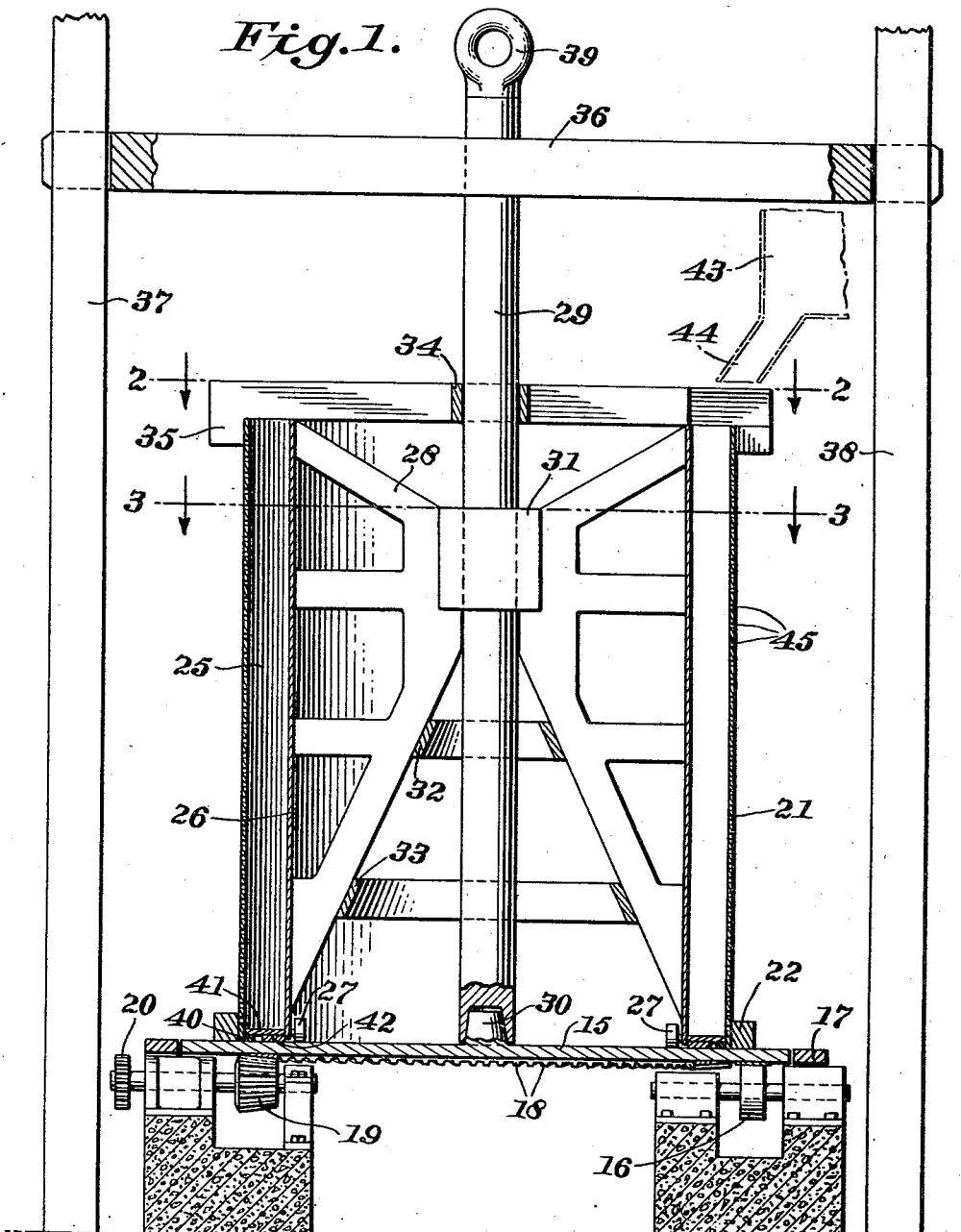
Figure 1 is a vertical section of apparatus according to the invention, including inner and outer forms disposed in upright position for charging.

Referring first to Figures 1 to 3, reference numeral 15 designates a turntable mounted on rollers as at 16 and retained against horizontal displacement by a fixed ring 17. The underside of the turntable has fixed thereto a bevel gear 18 engaged by a bevel pinion 19 adapted to be driven through a gear 20 or the like from any suitable source of power.

Reference numeral 21 designates a cylindrical outer form which rests on the turntable and is centered thereon by a ring 22 fixed to the latter. The form 21 is diametrically split and its parts are adapted to be releasably held together by diametrically opposite sets of clamps as at 23 and 24, Figures 2 and 3.

Concentrically disposed within the form 21 is a core 25 which includes a cylindrical shell 26, the shell having mounted on radial axes at its lower inner end rollers as at 27 by which the core is supported on the turntable. A number of generally triangular webs 28 are welded in radial relation to the inner surface of the shell 26 and to a co-axial shaft 29 which at its lower end is provided with a socket engaged by a centering pin 30 on the turntable. Also fixedly secured to the adjacent inner portions of the webs, and surrounding shaft 29, is a vibrator 31 which may be of any usual construction such as now on the market and used for heavy vibrating work. Also, the inner edges of the webs 28 have welded thereto reinforcing rings 32 and 33 so that an extremely rigid core structure is provided. If desired, the webs may be provided with cutouts as shown.

Strung on shaft 29 is a spider 34 whose arms have depending portions 35 which engage over the outer upper end of the outer form so as to center the latter with respect to the shaft and the core. Above spider 34, shaft 29 is fixed to a horizontal bar 36 whose outer ends have vertical openings slidably receiving fixed vertical columns 37 and 38. The upper extremity of shaft 29 is formed with an eye 39 adapted to be hooked into by hoisting apparatus.

At its lower inner end the outer form has welded thereto a split ring 40 which underlies the outer margins of a ring 41 which fills the space between the outer form and the core, ring having a foot portion 42 of the same height as ring 40, or of somewhat greater height.

In the use of the apparatus, the turntable is rotated at a suitable speed and carries with it the outer form, plate 41 and spider 35, which latter is freely rotatable about shaft 29. The core 25, however, is held against rotation due to its rigid connection with the cross bar 36. A stiff concrete mix is fed from a supply hopper 43 through a spout 44 to the space between the core and the outer form, the spider arms being preferably bevelled on top in order that the mix may readily slide therefrom. As the mix is being fed, the vibrator 31 is operated and imparts a rapid and powerful vibratory action to the shell 26 so that the mix is quickly and thoroughly compacted as it drops into the mold space, being carried around with the outer form and bottom closure ring so that the delivery from the spout is evenly distributed. The inner form exerts a troweling action as well as imparting vibration.

While the mix is stiff, preferably with zero slump or better, some water will rise as the result of the vibration and this can be drained off through small openings 45 in the outer form and the shell 26 can be similarly perforated if desired. Or, the mix may be made still drier as the top of the form is approached, coming to proper consistency by taking up the water rising from the mix at the bottom.

The numerous webs 28 serve to transmit the vibrations substantially uniformly in radial directions to the shell 26 from the vibrator 31. It will be noted that the vibrator is disposed adjacent the top of the core and this is for the reason that since the first fed mix will be subjected to greater vibration in point of time, the strongest vibratory action should be delivered adjacent the top of the core. The disclosed arrangement gives a longitudinally balanced action whereby uniform denseness throughout the length of the pipe is secured at the time the casting operation is completed. I prefer to use vibrators having as high frequency as possible. Vibrators at present on the market have from 3600 to 15,000 frequencies per minute, but the invention is not confined to this range.

As soon as the mold cavity is filled, a hoisting chain is hooked into the eye 39 and the core, together with the spider 34, is elevated above the outer form and the formed pipe within the latter. During the elevation of the core, vibration is continued for the purpose of facilitating its removal and rotation of the outer form, and therewith the formed pipe, is continued so that the core is exerting a troweling action on the inner face of the pipe during its removal.

After the core has been completely removed, the turntable is stopped and the outer form, together with the formed pipe, is lifted clear and taken to storage with the pipe held in the form on bottom ring 41. When the outer form and the pipe have been deposited, the clamps 23 and 24 are unfastened and the form is removed, leaving the pipe standing on the ring 41 as supported by the foot 42. The form may be immediately returned and reused.

If desired, a coiled reinforcing rod can be placed in the space between the outer form and core and desirably the coil may be of the elliptical section, or plan, as shown at 46 in Figure 2 so that the coil portions at the ends of the major axes are nearer the outer form than are the intermediate coil portions. Superior reinforcement is thus secured, the pipe being laid with the major axis of the coil upright. Whatever the shape in plan of the reinforcing coil, it can be accurately positioned between the forms by means of spacers such as shown at 46', Figure 2. These spacers, as here shown, comprise short lengths of stiff wire wrapped about and welded to the convolutions at spaced points and extending generally radially between the forms so that the coil is rigidly maintained in proper position during the casting of the pipe. The same spacing means may, of course, be applied to other forms of reinforce, such as wire mesh.

The apparatus as described produces a cylindrical pipe of uniform wall thickness and with square ends. It will be evident, however, that various shapes of pipe with various end configurations may be formed. For example, a tapering section can be formed by making the core and outer form conical with small end down. The pipe can be made of varied cross sectional contours by appropriately shaping the core and outer form. For example, these can be elliptical and in that case both would turn together, cross bar 36 being discarded, or both could be stationary, the mix in the latter case being fed around the cavity for evenness of distribution. To produce tongue and groove ends, for example, appropriate forms can be mounted on the bottom plate 41 and beneath the arms of spider 34 at the top of the cavity.

Bell and spigot ends can be readily produced by appropriately configuring the core and outer form to produce the bell at the upper end of the pipe.

In any event, by applying the vibration through the core, a pipe is produced which is distinguishable by having an inner face thickness of greater denseness, this for the reason that the vibrations diminish in force outwardly. This is, of course, a very desirable feature since it is the inner surface of the pipe which is subject to wear in use.

In Figure 4, the outer form 47 is the same as before, but rests within a centering ring 48 on a supporting ring 49 which rims a pit 50. Reference numeral 51 designates a conventional packer head equipped with a vibrator 52 and as here shown, provided with a depending cylindrical skirt 53. Reference numeral 54 designates a bottom closure ring overlying a split abutment ring 55 fixed to the lower inner end of the outer form, ring 54 being provided with an annular foot 56. A post 57 is fixed to the packer head in the usual manner and is rotatable by mechanism 58 and can be elevated by mechanism including the chain 59.

At the start of the forming operation, the top of the head is level with the top of ring 54 and as the mix is charged, the head is rotated and elevated and the vibrator is operated. The elevation, rotation and vibration of the packer head is continued until the skirt is clear of the upper end of the outer form whereupon the latter, with the formed pipe therein, may be taken away as before.

The skirt 53 may be omitted, but is ordinarily provided in a length such as to extend below the zone of violent vibration so as to prevent any tendency to cave in at this point.

Referring now to Figures 5 and 6, reference numeral 60 designates a two-part outer form supported horizontally on cradle blocks 61 and 62 and having a top charging slot 63 which extends nearly out to its ends. Caps 64 and 65 have annular flanges engaging around the ends of the form, the caps being secured to the latter by hook means or clamps as at 66. Reference numeral 67 designates generally a core including a cylindrical shell 68. A shaft 69 is supported centrally of shell 68 by rigid radial members as at 70 and projects at one end through a central opening of cap 64 and at the other end into a central opening of cap 65 so as to center the core. Reference numerals 71 and 72 designate vibrators which are in rigid connection with the shell 68 through a distributing system of web members as illustrated. Reference numeral 73 designates an open bottom hopper adapted to be removably supported on the outer form in register with the charging slot 63.

In the use of this apparatus, the mix is fed into the hopper and thence into the cavity between the forms, the vibrators being operated and acting to quickly compact the mix. When the cavity has been filled, the hopper is removed and the concrete is troweled off at the slot 63. An eye 74 on the projecting end of shaft 69 can now be hooked into by a hoisting chain and the forms and the pipe confined thereby can be lifted away from the supports 61 and 62 and up-ended. Cap 64 is now released from the outer form and the core together with cap 64 is further elevated, with continued vibration to clear it from the formed pipe. Thereafter, the outer form, cap 65 and the formed pipe are taken away to storage and set in upright position. Upon slightly lifting the outer form, it can be unclamped and returned for reuse, the pipe remaining standing on the cap 65.

In Figures 7 to 10, reference numeral 75 represents a diametrically split outer form whose sections are releasably clamped together as before, the form being provided with a top charging slot 76. Centrally the form is equipped with horizontal trunnions 77 and 78 adapted to be supported in upwardly open notches or bearings in posts 79 and 80, Figure 9. An end ring 81 is removably secured to the outer form by means such as latches 82 pivoted on the outer form and engaging radial lugs on the ring. The ring centers one end of a core 83 whose other end is centered by an end ring or pallet 84 which lies just inwardly of abutment lugs 85 fixed inside the extremity of the outer form. Ring 84 is provided with feet 86 which project beyond the end of the core when the pallet is against the lugs 85. The core 83 includes a cylindrical shell 87 and is positioned against axial displacement relative to the outer form by means of a pivoted dog 88 on ring 81 engaged in a slot of shell 87. Inwardly, the shell has secured thereto the ends of radial spider arms 89 which extend from bearing portions in which is rotatable, coaxially with the shell, a shaft 90 which is provided with eccentric weights 91, the bearing portions being rigidly connected with the shell by a truss structure as shown. Shaft 90 is adapted to be driven rapidly from a motor 92 through a flexible shaft 93. Reference numeral 94 designates a vibrator secured centrally to the top inner side of the shell 87 and reference numeral 95 designates a vibrator secured centrally of the bottom of the outer form 75. In charging position, the described assembly is supported horizontally by posts 79 and 80 and is blocked in this position by any suitable means. A hopper 96, Figure 8, is like hopper 73 of Figures 5 and 6 except that it has a bottom closure slide 97. With the slide closed, the hopper may be filled with the mix while the forms are being put together and arranged on the supporting posts, and then may be hoisted into register with the charging slide 76 and the slide withdrawn to permit the mix to flow into the mold space. During charging the vibrators 94 and 95 are operated. When charging is completed, the hopper is removed as before and the concrete troweled off at the slot 76.

Reference numeral 98 designates generally a wheeled frame including a cross beam 99 having bottom flanges on which travels a trolley 100 of a chain hoist 101 which includes a bottom block 102 to which is swiveled a bar 103 from whose ends depend chains 104 and 105 provided with hooks at their free ends. After the pipe has been formed in the manner above described, the molding apparatus is unblocked and swung to the upright position shown in Figure 9. Chains 104 and 105 are now hooked into loops 106 and 107 on the outer form and the apparatus is lifted away from the posts and set on the floor in upright position. Dog 88 is now released and the chains 104 and 105 are engaged with arms of the upper spider 89 and the core is lifted up and away while vibration is applied by operating eccentrically weighted shaft 90, the other vibrators being inactive at this time. Rotation of shaft 90 exerts a rotary effect on the core 83 and consequently, if the outer form is held, there will be a troweling action on the inner surface of the pipe as the core is withdrawn.

It will be obvious that the forms 75 and 87 can be of any desired cross sectional configuration, and that any desired end configuration can be applied to the pipe. As shown in Figure 7, for example, the end rings 81 and 84 are provided with annular formations 108 and 109 for the production of tongue and groove ends.

Obviously, a core like that of Figures 5 and 6 could be substituted in the assembly shown in Figures 7 and 8.

In Figure 11, the core 110 is assumed to be the same as that shown in Figures 5 and 6. The outer form 111 is provided with a top charging slot and is split top and bottom and its sections hinged together at the bottom, being retained in closed relation by cap members such as shown in Figure 5 and also by auxiliary clamp means so as to prevent opening when the core is being removed. The outer form is provided with a multiplicity of small openings and with jackets 112 and 113 which lead to a source of suction through hoses as at 114. Trunnions 115 and 116 are provided for the support of the forms in the manner described in connection with Figures 7 to 10. In the use of this apparatus, vibration is applied during the charging operation and suction is also applied so that any excess water is withdrawn, thus rendering the pipe all the more stable. Suction can be continued for any desired length of time after charging has been completed.

In Figure 12 reference numeral 120 designates an outer form which is square in section and composed of two parts releasably secured together by clamps along diagonally opposite edges. As before, a bottom plate or pallet overlies inner bottom lugs on the outer form and has foot portions in the nature of those shown at 86 in Figure 7. The pallet, as here contemplated, has four symmetrically arranged bottom openings which receive and position the lower ends of shafts 121 of cores 122 which are equipped with vibrators 123 and distributing webs 124 like those in Figures 1 and 3. With the cores disposed as shown, the concrete mix is charged into the outer form while the inner cores are vibrating and when the casting is completed the cores are withdrawn singly or simultaneously while still being vibrated. In this manner a conduit section having four passages is produced. Obviously, the external contour of the conduit can be determined as desired by the use of appropriate outer forms and the number and arrangement of openings can be determined by the use of an appropriately disposed number of cores.

According to Figures 13 and 14, the outer form 150 rests on a flanged ring 151 which rims a pit 152 and the inturned lower edge of the form supports a pallet 153 which centers the lower end of the inner form 125. An appropriate end plate or pallet is provided at the upper end of the forms and the inner form is supported by any suitable means either from above or from below. Both of the forms are provided throughout with small perforations 125' and 150' for the escape of excess water from the mix. These slots may have a width of $\frac{1}{16}$ inch, for example. In this case the inner form is shown as being split on one side at 154 and extending along the inner margins of the form at each side of the split are angles 155 and 156 with which is engaged a longitudinally extending locking plate 157 which serves to hold the adjacent edges of the core in register. By removing the plate one edge can be sprung over the other so as to slightly collapse the core to facilitate its removal.

Reference numeral 126 designates a vibrator body slidable on an axial shaft 127 whose lower end is supported by an arm 127' projecting radially inwardly from the wall of core 125, the upper end of the shaft being similarly or otherwise appropriately centered. Projecting from the body 126 are a number of radiating arms 128 having rollers 129 at their outer ends bearing against the inner walls of the core. At the beginning of the charging operation the vibrator assembly is at the bottom of the inner core and as charging continues it is elevated by means such as a chain 130, following the level of the mix upwardly. In this manner the maximum effect of the vibrator is transmitted to the core throughout the length of the latter and the compacting of the concrete be progressively completed upwardly with resulting uniformity throughout. Obviously the vibrator assembly may be held stationary in a position to give a predominant upper effect as in Figure 1. On the completion of the casting operation the core is permitted to drop under its own weight into the pit 152. This can be facilitated by removing plate 157 and springing one edge of the core, at the split 154, slightly over the other to contract the core. This can be done to some extent without removal of the vibrator assembly, or the latter may be removed if desired. In any event, after the core has been dropped below the pallet 153, the outer form, carrying the pipe, can be lifted away and upon deposit the outer form can be removed, leaving the pipe supported on the pallet for curing.

In Figure 15 the arm 128' is shown as being composed of telescoped portions 131 and 132, the latter having a pin 133 working in a longitudinal slot 134 of the former. A nut 135 is swiveled on portion 131 and threaded on portion 132. By adjusting the nut substantially uniform contact of all of the rollers 136 against the inner surface of the core 125 can be obtained.

Figure 16 shows a traversable vibrator assembly including three vibrators 137, 138 and 139 equi-angularly disposed about a central ring 140 which is slidable on shaft 127, the vibrators being joined to the ring by arms as shown, and to an outer framework carrying rollers 141. In this arrangement the several vibrators exert a combined powerful action which is the more effective in view of the closeness of the vibrators to the inner walls of the core 125. During casting the vibrator assembly is elevated as in the embodiment of Figures 13 and 14.

Machine made pipe sections of ordinary length produced in accordance with the invention will stand without any danger of collapse upon immediate removal of both the inner and outer forms and the same applies to longer lengths which, under previous practices, would collapse upon the removal of peripheral support. In any event, in the case of such longer lengths, the quality of concrete produced will be such as to permit earlier removal of the forms than heretofore possible. When the pipe is cast in horizontal position it is preferably up-ended, as described, while removing the core. However, with an originally stiff mix, thoroughly treated by vibration in accordance with the invention, the core may be immediately removed horizontally without collapsing the pipe.

In the case of large diameter pipe, the wall thickness may in some cases be too great to enable the vibration of the core, unless the vibratory effect is increased, to carry through sufficiently powerfully to the outer form and in this case a wetter mix would be necessary. In vertical casting apparatus such for example as is shown in Figure 1, this wetter mix can, of course, be readily handled, the only difference from the described procedure being that the forms cannot be immediately removed at the completion of casting. In the case of horizontal casting with apparatus such as is shown in Figures 7 and 8, the outer form 75, Figure 17, may have hinged thereto along one margin of slot 76, as at 140, a door or closure 141 which can be swung to the closed position shown and secured by latches as at 142 so that upon up-ending the assembly there will be no danger of the loss of concrete through the slot. As shown in Figure 17, the closure has a downward longitudinal offset 143 which is transversely curved on the arc of the outer form so that when the door is closed the inner surface of the outer form is substantially continuous throughout. During charging the door may be swung back out of the way so that the charging hopper may be positioned above the slot as in Figure 8.

It will be understood that in horizontal casting the same spacer means for the reinforce as shown in Figure 2 may be used. The spacer members, rigidly secured to the reinforce and extending freely therefrom in both directions, engage the inner and outer forms so that the reinforce will be retained in its designated position during casting. It may be pointed out that in horizontal casting a superior bond between the concrete and the circumferentially disposed reinforce is secured as compared with the result in vertical casting. In vertical casting the water which rises from the concrete forms a film on the bottom portions of the horizontal, or nearly horizontal, portions of the reinforce so that an unsatisfactory bond is obtained at these points. In horizontal casting, on the other hand, this film does not exist except at the very top underside of the reinforce so that the concrete is uniformly bonded to the steel substantially throughout.

It will be seen that in all cases the arrangement is such as to distribute the vibratory force with uniformity. In all cases, whether casting vertically or horizontally at least the outer form is preferably provided throughout with minute holes or slots for the escape of excess water, and this is particularly so when a relatively wet mix is being used.

While I have shown varied apparatus for carrying out the new method, it will be understood that I do not necessarily limit myself to the use of any specific disclosure herein, the scope of the invention being defined in the following claims.

I claim:

1. The method of making concrete pipe which comprises feeding a stiff concrete mix into the space between a cylindrical core and an outer form, imparting rapid axially and circumferentially distributed vibrations to the core from within the latter during feed whereby to compact the mix, relatively rotating the core and the formed pipe, and moving the core and formed pipe axially apart while continuing the relative rotation and vibrating the core to facilitate its release from the pipe.

2. The method of making concrete pipe which comprises feeding a stiff concrete mix into the space between a core and an outer form which are horizontally disposed, imparting rapid axially and circumferentially distributed vibrations to the core from within the latter during feed whereby to compact the mix, up-ending the core and form with the formed pipe therebetween, and moving the core and form axially apart while vibrating the core to facilitate its release from the pipe.

3. Apparatus for making concrete pipe, comprising a core and an outer form defining between them a space for the reception of the mix, vibrating means within the core, and vibration transmitting truss systems connecting the vibrating means with the core at circumferentially and axially distributed areas of the latter.

4. Apparatus for making concrete pipe, comprising a core and an outer form, means for maintaining the core within the form in peripherally spaced relation thereto comprising closure means for the ends of the space between said core and form, means for releasably holding said closure means in operative position, trunnions on said form, and supporting means providing bearings for said trunnions whereby the form and therewith the core may be supported in horizontal or upright position, said form having a charging opening which is on top when the form is in horizontal position.

5. Apparatus for making concrete pipe comprising an outer form, a packer head, and a vibrating unit carried by said head.

6. Apparatus for making concrete pipe comprising an outer form, an inner form, and a vibrating unit comprising a vibrator and vibration transmitting means adapted to be traversed axially of the inner form with said transmitting means in contact with the inner surfaces of the latter.

7. Apparatus for making concrete pipe, comprising a core and an outer form defining between them a space for the reception of the mix, a vibrating means disposed within the core, and a vibration distributing system of rigid truss members between the vibrating means and core.

8. Apparatus for making concrete pipe, comprising an outer form and a cylindrical compacting and forming unit within said form and peripherally spaced therefrom, vibrating means carried by said unit for imparting rapid vibration thereto to compact the mix introduced into the space between said form and unit, means for elevating said unit relative to the form, and means for relatively rotating said form and unit while the latter is being elevated and vibrated.

GEORGE W. HUTCHINSON.